July 2, 1968  G. B. FOSTER  3,390,849
IDENTIFYING FLYING CRAFT
Filed Jan. 8, 1965  2 Sheets-Sheet 1
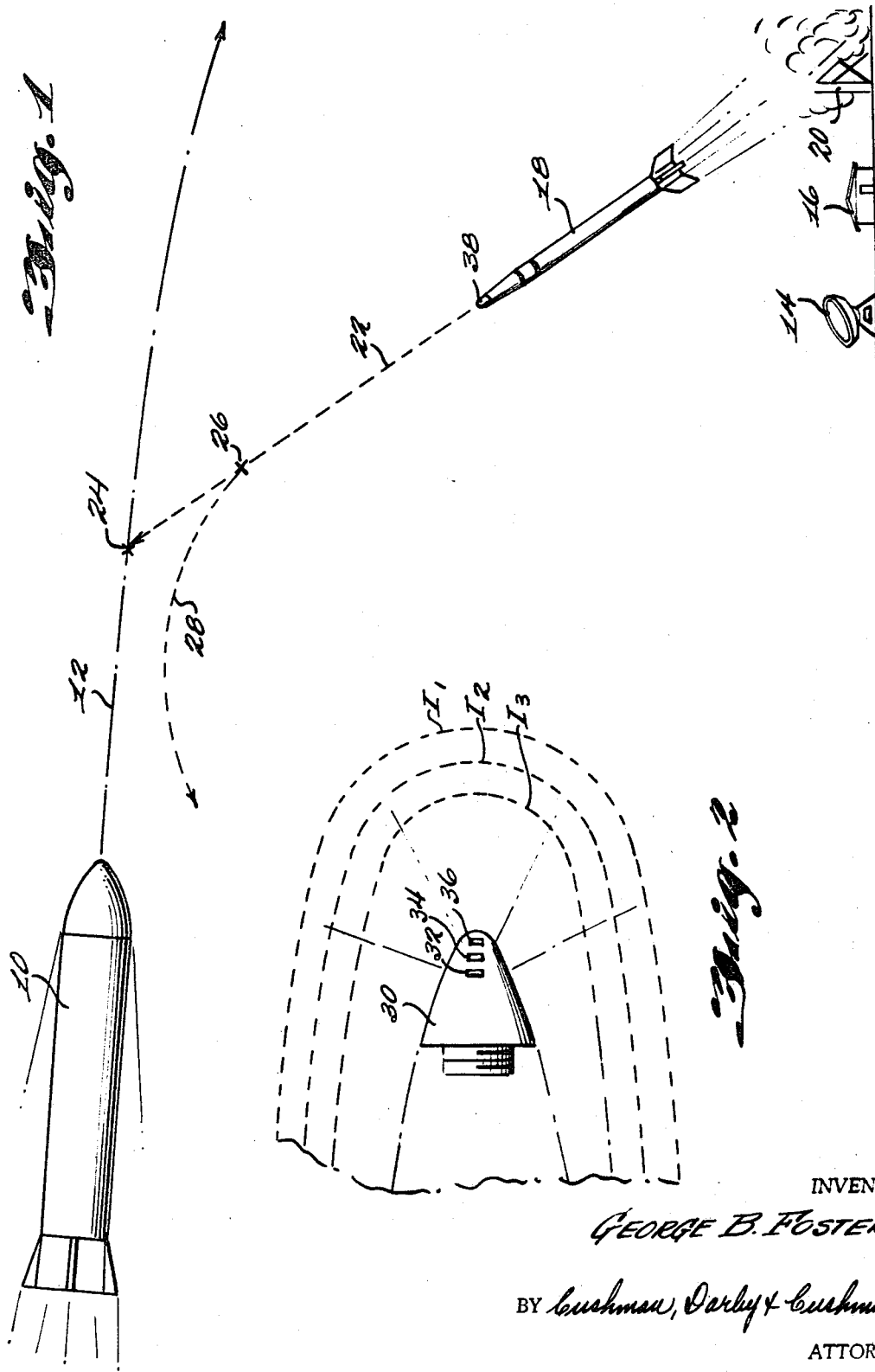
INVENTOR
GEORGE B. FOSTER
BY Cushman, Darby & Cushman
ATTORNEYS

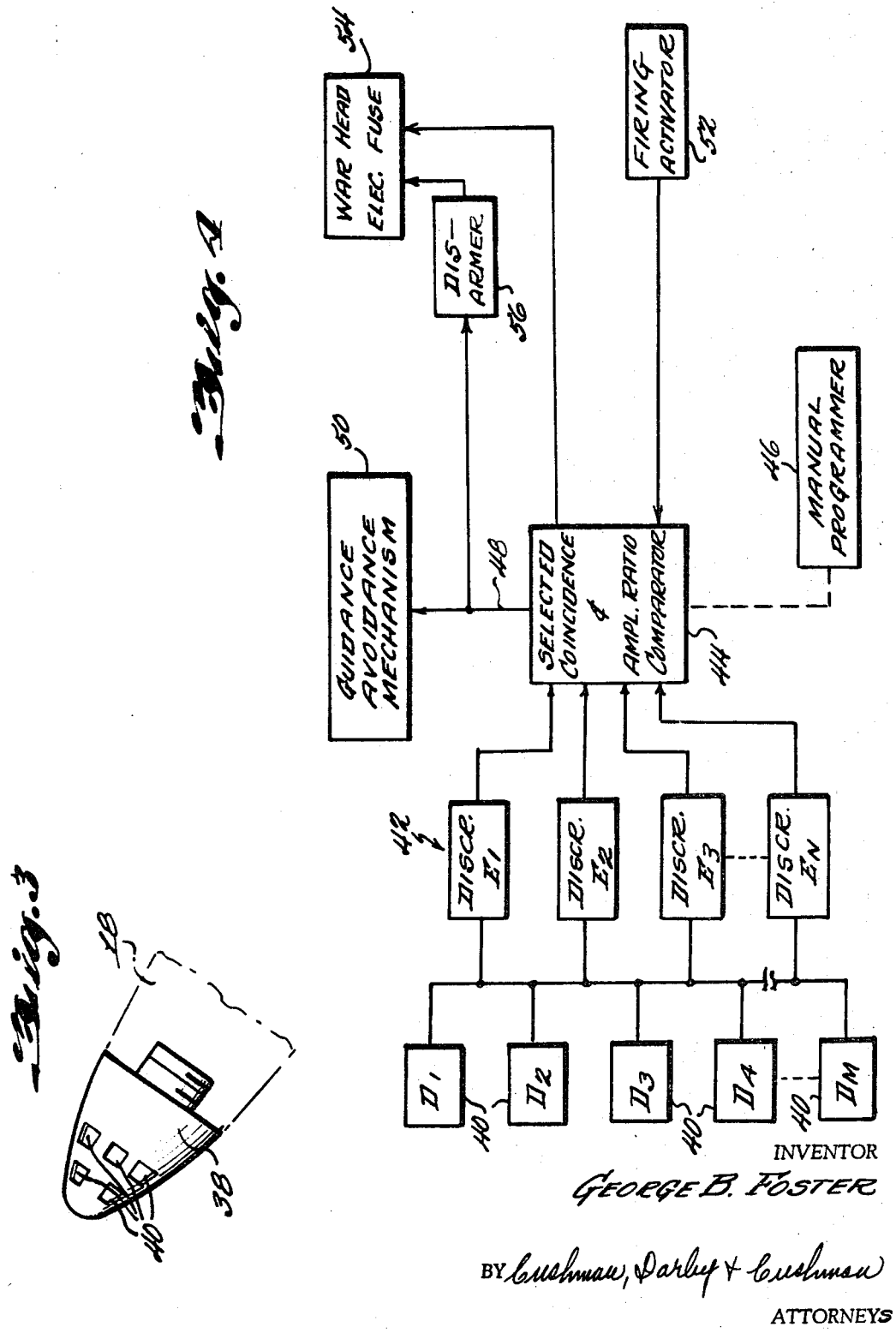

United States Patent Office 3,390,849
Patented July 2, 1968

3,390,849
IDENTIFYING FLYING CRAFT
George B. Foster, Worthington, Ohio, assignor to Industrial Nucleonics Corporation, a corporation of Ohio
Filed Jan. 8, 1965, Ser. No. 426,704
18 Claims. (Cl. 244—3.15)

This invention relates to an identification method, system, and apparatus for identifying friendly and unfriendly type flying craft, such as systems frequently referred to as "Identification Friend or Foe" (IFF).

While the present description proceeds relative to identifying ballistic missiles, it is also applicable to other flying craft whether same are in the earth's atmosphere or in space, and whether or not the craft is directly humanly piloted, for example, airplanes, drones, projectiles, satellites, spacecraft, and the like.

In view of the enormous speed at which any such craft flies these days, a severe problem exists in the timely identification thereof, for example, of missiles detected to be on an apparently unfriendly course. Intercepting vehicles such as anti-missile missiles are capable of intercepting and destroying such detecting missiles if adequate warning time is available following the positive identification of the detected missile as being unfriendly. Heretofore, the launching of anti-missile missiles from the ground, air or water (underneath and on top as from a ship), has been delayed until positive identification of the detected missile, but such delay greatly lessens the probability of the launched anti-missile missile achieving interception and destruction.

It is therefore an object of the present invention to provide a method, system, and apparatus by which a launched vehicle can positively identify an unknown flying craft.

Another object of the present invention is to provide a method, system and apparatus by which the launching of intercepting vehicles, such as anti-missile missiles, is at the optimum time prior to positive identification of a detected but unknown flying craft such as another missile, and on an optimum course for interception and destruction of the unknown craft if positive identification of a friendly nature is not obtained prior to interception and after launch.

In accordance with this invention, in the absence of positive initial identification as friendly, i.e., during the first moments of detection of a missile, an intercepting vehicle or anti-missile missile is launched on an interception course insured by a suitable guidance system of conventional nature, if desired. Additionally, the intercepting vehicle carries a guidance avoidance mechanism which can be operated during mutual approach of the missiles to veer or otherwise guide the intercepting vehicle off the interception and destruction course so that the flying craft may proceed on its mission. Such veering of the intercepting vehicle, however, is based upon positive, in flight, identification of the flying craft as being of a friendly character.

It is therefore another object of this invention to provide a method, system and apparatus for determining after launch of an intercepting vehicle whether or not an unknown flying craft is friendly or unfriendly, and then guiding the intercepting vehicle away from the flying craft only if it is determined to be friendly.

The means for determining in flight whether or not the flying craft is friendly, involves a complementing coding system which is employed in the friendly missiles and intercepting vehicles. In friendly missiles, this coding system preferably takes the form of nucleonic radiations coded in the nose cone of the friendly missiles to transmit radiations predetermined in various specific manners according to the code in use for the particular time in question. Specifically, the nucleonic radiations may be coded as to the ratio of radiation flux intensities of various specific energy levels. In the intercepting vehicle, then, is a nucleonic radiation receiver such as a spectrometer or the like which is set for the particular time in question in accordance with the code then in use, to detect only the proper intensity ratios of the selected energy levels. A guidance avoidance mechanism in the intercepting vehicle responds to the sensing of the proper radiation code, to maneuver the intercepting vehicle away from only those flying craft that have been determined thereby to be friendly.

It is therefore a specific object of this invention to provide an IFF type method and system in which friendly craft are equipped to radiate coded nucleonic radiations and in which the intercepting vehicle is equipped with nucleonic radiation detection apparatus similarly coded and which senses in flight whether or not a flying craft which it is about to intercept is actually friendly or unfriendly. If friendly, then the intercepting vehicle automatically guides itself away from the friendly craft to prevent destruction thereof.

Of course, the invention is applicable to identification and possible destruction of anti-anti missile missiles also. Further, it may be modified or supplemented to determine proximity, range rate, and/or miss distance as known in the art.

Other objects and advantages of this invention will become apparent to those of ordinary skill in the art upon reading the appended claims and the following detailed description of this invention, in conjunction with the attached drawings, in which:

FIGURE 1 is a diagrammatic representation of the operation of the invention,

FIGURE 2 illustrates the nose cone portion of a friendly missile equipped in accordance with the present invention, FIGURE 3 illustrates the nose cone portion of an intercepting vehicle or anti-missile missile equipped to sense coded radiations from friendly missiles, and FIGURE 4 is a diagram in block form of electronic and mechanical equipment usable in the intercepting vehicle.

The diagrammatic representation in FIGURE 1 shows a missile 10 which is moving along a path 12. The initial detection of missile 10 may be made by the ground radar equipment 14. If it cannot be thereby determined, or is not otherwise known, by personnel in block house 16, for example, whether the missile is friendly or unfriendly, this invention provides for the launching of an interception and destruction vehicle, such as an anti-missile missile 18 from conventional equipment 20, on an interception course 22 whereby the intercepting missile 18 can destroy missile 10 at point 24.

It is an obect of this system, however, to avoid destruction of msisile 10, if it is determined by equipment in the anti-missile missile 18, to be of a friendly character. This determination is made by the anti-missile missile in flight whenever it comes close enough to missile 10 to sense whether or not missile 10 is radiating the proper code. Such a determination may be made at point 26, for example, along the path 22 of anti-missile missile 18. Upon sensing the proper code radiated from missile 10, anti-missile missile 18 automatically veers off the interception course 22 onto an avoidance path 28, so as not to destroy missile 10 but to allow it to continue on its path 12 beyond point 24. Anti-missile missile 18 may destroy itself, if such is desired, before it returns to the earth's surface and while it is still in the air or space thereabove, after it has veered onto the avoidance path 28 and is sufficiently removed from missile 10 so as not to damage missile 10. Conventional means of timing and destroying anti-missile missile 18 may be used in this regard, as desired.

While various codes and signals can be used in this invention to provide the means of effecting identification of friendly flying craft, it is preferred to use nucleonic radiations which are used according to a predetermined code. Preferably, the coding is based upon selection of various energy levels of different nucleonic radiations, for example, those from different radioactive materials, and more preferably, it is based upon the selection of various ratios of radiation flux intensities of selected energy levels. Nose cone 30 (FIGURE 2) of a friendly missile carries a coded nucleonic radiation storage facility which may have various radioisotope pellet storage compartments diagrammatically indicated 32, 34 and 36. A larger or smaller number of compartments may be utilized as desired. In these compartments are stored a selected type and quantity of various radioisotopes, the selection of type and quantity being in accordance with the code that exists for the time in question. The number of storage compartments 32, 34, 36 which are used at any one time may be one or all or any intermediate number. As is well known, numerous different radioisotopes have a number of energy levels or peaks which can be separately sensed. Some of these peaks are shown in the following chart for a few exemplary radioisotopes.

| Radioisotope Half Life (yrs.) Specific Activity Millicuries/gram) | Hard Gamma Energy Mev.) Peaks | Approximate Relative Intensities |
| --- | --- | --- |
| Europium 154 16 >250 | .123 .725 1.277 | .35 .21 .42 |
| Cesium 134 2.3 >3,000 | .200 .569 .605 .801 | .04 .13 1.00 .18 |
| Cobalt 60 5.27 >10,000 | 2.505 1.333 | .35 .99 |
| Krypton 85 10.4 ~21,000 | .54 (only one peak) | |

As indicated in the above chart, the first three radioisotopes referred to have two or more effective spectral lines or energy peaks, and these have approximate relative intensities as to each other for any given radioisotope, as shown in the last column.

The last isotope listed in the chart has only a single energy level. The relative intensities of different energy levels of the same isotope are fixed as an inherent characteristic of the isotope itself. However, by varying the relative quantities of two isotopes the relative intensities of the energy peaks or levels between them may be varied.

Coding according to the present invention may be by use of a single radioisotope which has two or more energy peaks, the relative intensities of which can be separately detected and discriminated against. It is preferable, however, to make the coding more complex, by using more than one isotope and varying the relative quantities thereof in accordance with the code in use at the time in question, so that comparison of the relative intensities of energy peaks of different radioisotopes can be the basis for the code. When two different radioisotopes are used, for example on a five-to-one basis as to quantity, a different ratio of relative intensiites of energy levels of the two isotopes is obtained than if the isotope quantities were on a one-to-one basis. Of course, two different radioisotopes which each have only one energy peak, can also be employed in the same manner. As is below apparent, any desired number (greater than one) of energy levels may be selected from one, two or more different radioisotopes for use in the coding arrangement.

As above indicated, the selected radioisotope type and quantity are stored in the radioactive source compartments 32, 34 and 36 of the nose cone 30 of a friendly ballistic missile. Three different flux intensities $I_1$, $I_2$ and $I_3$ are diagrammatically indicated in FIGURE 2 for three different selected energy levels which, as previously indicated, may be from one, two or three radioactive isotopes.

In FIGURE 3, the nose cone 38 of the intercepting vehicle or anti-missile missile 18 of FIGURE 1 is equipped with a plurality of nucleonic radiation detectors 40. Internally of the anti-missile missile 18, these detectors may be connected in a high speed spectrometer configuration capable of determining the spectral characteristics of nucleonic radiations emitted by missiles whose identification is in doubt, as indicated in FIGURE 4.

A plurality of detectors $D_1 \ldots D_M$ are illustrated in FIGURE 4. A sizable number M of nucleonic radiation detectors 40 may be disposed in the nose cone 38 of the anti-missile missile as necessary to take advantage of numerous code combinations. Each of these detectors may itself be differently energy selective so that its output will be a signal having an amplitude corresponding to the flux intensity of the particular energy selected by the detector. On the other hand, the energy selectivity may be made electronically as by use of N energy discriminators 42, each of which effectively selects the detector output signal that results from detection of a given energy level or peak, for example, energies $E_1$, $E_2$ $E_3$ $\ldots E_N$. The number of such discriminators is preferably large so that any one or more of numerous possible energy levels can be utilized in the coded combinations.

The outputs of all energy discriminators 42 are applied to a variable coincidence and amplitude ratio comparator circuit 44. The ones of the discriminator outputs that are selected in accordance with the code in use at the present time are selected by manual operation of a programmer 46. Upon coincidence of all the selected discriminator outputs, the amplitude ratios of selected ones of those outputs are compared in circuitry 44. If the resulting comparison is in accordance with the code manually programmed into the comparator, a given output signal occurs on output line 48. This signal, in turn, operates guidance mechanism 50, to cause the intercepting vehicle to veer off its interception course and avoid the craft which it otherwise would destroy. That is, if the unknown missile 10 in FIGURE 1 does not transmit the proper nucleonic code so as to cause an output signal on line 48 in FIGURE 4, firing actuator 52 is connected through comparator 44 to a warhead electric fuse 54 so as to cause destruction of missile 10 at point 24. However, if the detectors in the intercepting vehicle receive the proper nucleonic code from missile 10, then that missile is assumed to be of the friendly type, and an output signal is automatically generated on line 48 from comparator 44. This not only causes the anti-missile missile to execute an avoidance maneuver, but also causes the warhead fuse 54 to be disarmed by circuit 56, as a safety measure. Should the anti-missile missile be possibly returned toward an undesirable area of the earth's surface by following the avoidance path 28, self-destruction capabilities may be incorporated in the anti-missile missile and caused to operate after avoiding a friendly missile and before reaching the earth, if desired.

Manual programmer 4 in FIGURE 4 may be any type of switching mechanism including use of replaceable, interchangeable code cards, for example, printed circuit cards, for completing various circuits. Different cards, or different combinations of manual switching arrangements, may be utilized for the different overall code combinations that could be selected. Programmer 46 pre-sets the acceptance wavelengths of detected radiations, i.e., the selected energy levels or frequencies and flux intensity ratios thereof, and such are changeable at whatever intervals deemed appropriate by the proper security personnel. Similarly, the nose cones of friendly missiles or the like may be coded by use of a predetermined packets of specific quantities and types of radioactive pellets, which packets can be interchanged from time to time in order to vary the code that is to be in use for a given time. The presence of such radioactive materials in the nose cones of friendly missiles results in a given radiation flux spectrum being transmitted from the missile. While the relationship of flux intensities of a given isotope is not selectable but is a fixed characteristic of an isotope itself, the relationship of the flux intensities between different spectral lines of different isotopes is, however, subject to selection by variation of the amounts of these isotopes. The spectrometer, which includes the detectors and discriminators 40 and 42 of FIGURE 4, in the nose cone of the intercepting vehicle, is correlated as by circuitry 44 and programmer 46 to have the same nucleonic coding combination as that of friendly vehicles for the time in question, and therefore is adept to operating the guidance avoidance mechanism 50 to prevent destruction of friendly vehicles.

As previously indicated, radioisotopes may be usable to generate the coded nucleonic radiation to be provided by friendly missiles. Preferably, hard gamma radiation is used as long as the half life thereof and specific activity are sufficient for the purposes at hand. The foregoing chart indicates some exemplary isotopes providing hard gamma rays and the half life and specific activity of those isotopes. Other usable isotopes may be obtained by reference to Nuclear Data Tables, part 4, 1960, United States Atomic Energy Commission; Radiological Health Book, published by the United States Department of Health, Education, and Welfare, September 1960, revised edition; and Catalog and Price List—Radioisotopes, published by Oak Ridge National Laboratory, May 1960, Third Revision. Besides radioisotopes, other means of generating nucleonic radiation may be employed if desired, for example X-radiation, or bremsstrahlung such as generated by equipment like that disclosed in the Foster et al. Patent Re. 25,353, or a combination of various types of radiations such as bremsstrahlung and beta rays as generated for example by equipment referred to in the Foster Patent 2,964,631, and in the copending H. R. Chope application, Ser. No. 408,955, on Measuring Ablation Shield Thickness. Variation in the radiation energy of bremsstrahlung may be accomplished as in the Foster Patent 2,999,935, if desired.

It is therefore apparent that this invention has provided for all of the objects and advantages indicated above. Other objects and advantages, and even further modifications and different embodiments of the invention, will become apparent to those of ordinary skill in the art upon reading this disclosure. However, it is intended that this disclosure be considered exemplary and not limitative, this invention being described by the appended claims.

What is claimed is:

1. A method of identifying friendly and unfriendly type flying craft including the steps of:
   depositing on said friendly craft at least one mass of at least one radioisotope having a characteristic pattern of nucleonic radiation that includes at least one peak, externally radiating from said deposited mass detectable radiations coded in a predetermined manner,
   periodically conforming the pattern of externally radiated coded, radiations to the code instantly in use,
   sensing from a flying vehicle for the said coded radiations, and
   automatically guiding the said vehicle away from said friendly craft in response to the actual sensing of said radiations coded in accordance with the code instantly in use in said predetermined manner.

2. A method of identifying friendly and unfriendly type flying craft including the steps of:
   depositing on said friendly craft at least one mass of at least one radioiostope having a characteristic pattern of nucleonic radiation that includes at least one peak, externally radiating from said friendly craft detectable nucleonic radiations coded in a predetermined manner,
   periodically conforming the pattern of externally radiated coded, radiations to the code instantly in use,
   sensing from a flying vehicle for the said coded nucleonic radiations, and
   guiding the said vehicle away from said friendly craft in response to the said sensing of said nucleonic radiations coded in accordance with the code instantly in use in said predetermined manner.

3. A method as in claim 2 wherein the depositing step comprises removably depositing a plurality of radioisotope masses on said friendly craft, at least one of said masses being of differing radioisotope than the remainder of said masses.

4. A friendly flying craft-protecting, friend and foe identification method including the steps of:
   removably depositing in at least one receptacle on each friendly flying craft likely to encounter friendly missilies at least one mass of at least one radioisotope having a characteristic pattern of nucleonic radiation that includes at least one peak;
   periodically generally simultaneously removing each one mass of at least one radioisotope from each receptacle on each friendly flying craft likely to encounter friendly missilies and depositing in its place at least one other mass of at least one radioisotope having a different characteristic pattern of nucleonic radiation than the removed mass it replaced,
   detecting an unknown flying craft,
   launching a missile to destructively intercept said unknown craft, and
   determining before such intercept and from sensing from on board said missile for the characteristic gamma radiation pattern then being produced by radioisotope masses in friendly flying craft whether the unknown craft is said friendly craft or an unfriendly craft.

5. The method of claim 4 further comprising: automatically guiding the missile off an intercept course with said unknown flying craft only upon having sensed from on board the missile the presence of said characteristic nucleonic radiation pattern then being produced by radioactive masses in friendly flying craft being emitted by the unknown flying craft.

6. A method of equipping friendly flying craft with means to allow their identification by and to prevent their unintended destruction by friendly missiles comprising: removably depositing in at least one receptacle on each friendly flying craft likely to encounter friendly missilies at least one mass of at least one radioistope having a characteristic pattern of nucleonic radiation that includes at least one peak; periodically generally simultaneously removing each one mass of at least one radioistope from each receptacle on each friendly flying craft likely to encounter friendly missiles and depositing in its place at least one other mass of at least one radioisotope having a different characteristic pattern of nucleonic radiation than the removed mass it replaced.

7. A method of distinguishing friendly flying craft which radiate externally deflectable nucleonic radiations according to a code that changes periodically, from unfriendly flying craft which do not radiate the correct nucleonic radiation code for the particular time period, comprising: providing a flying intercept craft capable of flight to the vicinity of detected unknown flying craft with a sensor for nucleonic radiation; programming the sensor to distinguish the radiation of said correct nucleonic radiation code from the absence of radiation of the correct nucleonic radiation code; and substantially concurrently with each changing of the correct nucleonic code, reprogramming the sensor in conformance with the code.

8. A system for identifying friend and foe type air and space craft and for destroying only the foe craft, comprising:

a friendly craft having nucleonic radiation source means coded to radiate from the craft a plurality of radiations having different predetermined characteristics, said predetermined characteristics being in accordance with the code instantly in use, and a launchable vehicle capable of destructively intercepting said friendly craft in flight and having means for avoiding such interception after launching including:

means, including nucleonic radiation detector means, coded to detect the said radiations of different predetermined characteristics in accordance with the code instantly in use as the said vehicle approaches said friendly craft, and guidance avoidance means in said vehicle responsive to the detection of said coded radiations of different predetermined characteristics in accordance with the code instantly in use for guiding the said vehicle away from said friendly craft before the said destructive interception thereof.

9. A system as in claim 8 wherein different radiations from said source means are coded according to their relative intensities.

10. A system as in claim 9 wherein said different radiations are also coded according to selected energies.

11. A system as in claim 10 wherein said source means includes different nucleonic sources for determining at least some of said selected radiation energies.

12. A system as in claim 11 wherein the said different nucleonic sources are coded in accordance with the relative amounts thereof.

13. In a launchable vehicle capable of destructively intercepting flying craft not radiating the code of radiations conforming to the code instantly in use, radiation detection apparatus means coded in accordance with said code instantly in use for providing a given output signal only if said predetermined code of radiations is received, and guidance means coupled to said detection apparatus for guiding said vehicle away from said flying craft only in response to said given output signal.

14. A launchable vehicle as in claim 13 including a warhead and means responsive to said given output signal for disarming said warhead.

15. A launchable vehicle as in claim 13 wherein said detection apparatus includes means for selecting various nucleonic energy levels.

16. A launchable vehicle as in claim 13 wherein said detection apparatus includes means for comparing the relative intensities of selected nucleonic radiations.

17. A launchable vehicle as in claim 13 wherein said detection apparatus includes means for selecting various nucleonic energy levels and means for comparing the relative intensities of selected energy levels.

18. In a flyable vehicle capable of identifying flying craft which are transmitting nucleonic radiations coded in accordance with the code instantly in use in a predetermined manner, the improvement comprising:

radiation detection apparatus coded in accordance with the code instantly in use in accordance with said predetermined manner, and means responsive to said apparatus for causing a given output signal indicating the flying craft friendly only if said apparatus senses the said transmitted nucleonic radiations coded in said predetermined manner.

References Cited

UNITED STATES PATENTS

| | | |
|---|---|---|
| 2,472,136 | 6/1949 | Whitlock. |
| 2,987,621 | 6/1961 | Mielziner et al. _____ 250—83.3 X |
| 3,123,714 | 3/1964 | Chope _____ 250—199 |
| 3,167,652 | 1/1965 | Weisbrich _____ 250—106 X |
| 3,209,349 | 9/1965 | Prestwood _____ 343—7 |

BENJAMIN A. BORCHELT, *Primary Examiner.*

SAMUEL FEINBERG, *Examiner.*

W. C. ROCH, T. H. WEBB, *Assistant Examiners.*